US008600172B2

(12) United States Patent
Sengupta et al.

(10) Patent No.: US 8,600,172 B2
(45) Date of Patent: Dec. 3, 2013

(54) VIDEO BASED MATCHING AND TRACKING BY ANALYZING ONE OR MORE IMAGE ABSTRACTIONS

(75) Inventors: Kuntal Sengupta, Winchester, MA (US); Ian Westmacott, Wakefield, MA (US); Serdar Ince, Istanbul (TR)

(73) Assignee: Sensormatic Electronics, LLC, Boca Raton, FL (US)

( * ) Notice: Subject to any disclaimer, the term of this patent is extended or adjusted under 35 U.S.C. 154(b) by 152 days.

(21) Appl. No.: 13/049,527

(22) Filed: Mar. 16, 2011

(65) Prior Publication Data

US 2012/0237082 A1 Sep. 20, 2012

(51) Int. Cl.
*G06K 9/68* (2006.01)
(52) U.S. Cl.
USPC .......................................... 382/218; 382/103
(58) Field of Classification Search
USPC ................... 340/573.1; 345/419; 348/207.99; 375/346; 382/103, 107, 118, 131, 170, 382/199, 209, 294; 704/251; 706/12; 707/741, 748; 713/186
See application file for complete search history.

(56) References Cited

U.S. PATENT DOCUMENTS

| | | | | |
|---|---|---|---|---|
| 6,049,574 | A * | 4/2000 | Noonan et al. ................. | 375/346 |
| 6,594,392 | B2 * | 7/2003 | Santoni .......................... | 382/209 |
| 6,754,675 | B2 * | 6/2004 | Abdel-Mottaleb et al. ........... | 1/1 |
| 7,245,315 | B2 * | 7/2007 | Sadok et al. ..................... | 348/165 |
| 7,356,185 | B2 * | 4/2008 | Gewaltig et al. ............. | 382/199 |
| 7,505,604 | B2 * | 3/2009 | Zakrzewski et al. .......... | 382/100 |
| 7,711,155 | B1 * | 5/2010 | Sharma et al. ................. | 382/118 |
| 8,171,030 | B2 * | 5/2012 | Pereira et al. ................. | 707/741 |
| 8,224,029 | B2 * | 7/2012 | Saptharishi et al. .......... | 382/103 |
| 2003/0058111 | A1 * | 3/2003 | Lee et al. ..................... | 340/573.1 |
| 2003/0233232 | A1 * | 12/2003 | Fosler-Lussier et al. ..... | 704/251 |
| 2005/0168460 | A1 * | 8/2005 | Razdan et al. ................ | 345/419 |
| 2007/0030356 | A1 * | 2/2007 | Yea et al. ................. | 348/207.99 |
| 2007/0047840 | A1 * | 3/2007 | Xu et al. ....................... | 382/294 |

(Continued)

OTHER PUBLICATIONS

D. Comaniciu et al., "*Mean Shift: A Robust Approach Toward Feature Space Analysis*", IEEE Transactions on Pattern Analysis and Machine Intelligence, vol. 24, No. 5, May 2002 (17 pgs).

(Continued)

*Primary Examiner* — Vikkram Bali
*Assistant Examiner* — Xuemei Chen
(74) *Attorney, Agent, or Firm* — Brinks Gilson & Lione

(57) ABSTRACT

An analytical device is disclosed that analyzes whether a first image is similar to (or the same as) as a second image. The analytical device analyzes the first image by combining at least a part (or all) of the first image with at least a part (or all) of the second image, and by analyzing at least a part (or all) of the combined image. Part or all of the combination may be analyzed with respect to the abstraction of the first image and/or the abstraction of the second image. The abstraction may be based on a Bag of Features (BoF) description, based on a histogram of intensity values, or based on other types of abstraction methodologies. The analysis may involve comparing one or more aspects of the combination (such as the entropy or randomness of the combination) with the one or more aspects of the abstracted first image and/or abstracted second image. Based on the comparison, the analytical device may determine whether the first image is similar to or the same as the second image. The analytical device may work with a variety of images in a variety of applications including a video tracking system, a biometric analytic system, or a database image analytical system.

24 Claims, 12 Drawing Sheets

(56) References Cited

U.S. PATENT DOCUMENTS

| | | | |
|---|---|---|---|
| 2008/0235515 A1* | 9/2008 | Yedidia et al. | 713/186 |
| 2008/0292164 A1* | 11/2008 | Azar et al. | 382/131 |
| 2010/0034422 A1* | 2/2010 | James et al. | 382/103 |
| 2010/0082615 A1* | 4/2010 | Clinchant et al. | 707/728 |
| 2010/0254573 A1* | 10/2010 | Barlaud et al. | 382/107 |
| 2011/0026825 A1* | 2/2011 | Chaudhuri et al. | 382/170 |
| 2012/0054130 A1* | 3/2012 | Mensink et al. | 706/12 |
| 2012/0150651 A1* | 6/2012 | Hoffberg et al. | 705/14.58 |
| 2012/0158739 A1* | 6/2012 | Ah-Pine et al. | 707/748 |
| 2012/0207359 A1* | 8/2012 | Konukoglu et al. | 382/128 |
| 2012/0330447 A1* | 12/2012 | Gerlach et al. | 700/95 |

OTHER PUBLICATIONS

Fatih Porikli et al., "*Covariance Tracking using Model Update Based on Lie Algebra*", TR2005-127 Jun. 2006 (10 pgs).

European Search Report issued in corresponding EP Appln. No. 12160005.0 dated Nov. 12, 2012 (4 pages).

Studholme, C. et al., "An Overlap invariant Entropy Measure of 3D Medical Image Alignment", Pattern Recognition, Elsevier. GB, vol. 32, No. 1 Jan. 1, 1999, pp. 71-86, XP004151615.

Muhammad Muneed Ullah et al., "Improving Bag-of-Features Action Recognition with Non-Local Cues", Proceedings of the British Machine Vision Conference, Jan. 1, 2010, pp. 95.1-95.11, XP55042861.

\* cited by examiner $$B = \begin{bmatrix} 2 & 1 & 2 & 3 & 2 \\ 2 & 1 & 2 & 2 & 3 \\ 20 & 100 & 100 & 100 & 200 \end{bmatrix}$$

| Asset Scores | |
|---|---|
| Scene | change [%] |
| Aafes08 | 4.33 |
| AutoZone1 | 30.95 |
| DuaneReade1 | 10.05 |
| DuaneReade2 | 13.08 |
| DuaneReade3 | 1.09 |
| Medford1 | 15.74 |
| Medford2008_1 | 1.06 |
| Medford2008_track | 16.98 |
| Medford2_IP | 7.30 |
| Walgreens08 | -1.32 |

Fig. 12

VIDEO BASED MATCHING AND TRACKING BY ANALYZING ONE OR MORE IMAGE ABSTRACTIONS

BACKGROUND

Video tracking is the process of locating a moving object (or multiple objects) over time using a camera (or other image capturing device). Video tracking has a variety of uses, some of which include: security and surveillance; human-computer interaction; video communication and compression; augmented reality; traffic control; medical imaging; and video editing. Video tracking can be a time-consuming process due to the amount of data that is contained in video. Adding further to the complexity is the possible need to use object recognition techniques for tracking.

Typically, the objective of video tracking is to associate target objects in consecutive video frames. The association can be difficult when the objects are moving fast relative to the frame rate. Another situation that increases complexity of the problem is when the tracked object changes orientation over time.

Matching is an important component of the video tracking process in which part (or all) of a query image is matched to a part (or all) of another image. One general example is to match one image patch with a second image patch. A more specific example is to match one or more objects with one or more image patches in a query image. The object may be a person (or a part of a person, such as a face), a thing (such as an inanimate object), or the like.

One example of video tracking is illustrated in FIG. 1, which shows a simple example of image tracking a single object. In the present example depicted in FIG. 1, object A has been reliably tracked over three frames (shown to the left in FIG. 1). In the fourth frame, which is referred to as the query frame, the goal is to locate the image patch (shown in shading in FIG. 1) that corresponds to the object. In a more general scenario, there may be multiple objects that are matched and located in the query frame, and their corresponding image patches can overlap significantly. To add to this complexity, there can be lighting and appearance variation of an object from frame to frame. All this makes the task of matching a challenging problem. Therefore, a need exists to efficiently and accurately perform video tracking.

SUMMARY

An analytical device is disclosed that analyzes whether a first image is similar to (or the same as) as a second image. In a first aspect, the analytical device analyzes the first image by combining at least a part (or all) of the first image with at least a part (or all) of the second image, and by analyzing at least a part (or all) of the combined image. For instance, an abstraction of part or all of the first image may be combined with an abstraction of part or all of the second image. Part or all of the combination may be analyzed with respect to the abstraction of the first image and/or the abstraction of the second image. The abstraction may be based on a Bag of Features (BoF) description, based on a histogram of intensity values, or based on one or more other types of abstraction methodologies. The analysis may involve comparing one or more aspects of the combination (such as the entropy or randomness of the combination) with the one or more aspects of the abstracted first image and/or abstracted second image. Based on the comparison, the analytical device may determine whether the first image is similar to or the same as the second image. So that, if the entropy of the combined image increases a certain amount (such as increases minimally less than a predetermined level), the analytical device may conclude that the first image and the second image are similar. The analytical device may work with a variety of images in a variety of applications including a video tracking system, a biometric analytic system, or a database image analytical system.

In a second aspect, the analytical device may be a video tracking system that utilizes a Bag of Features (BoF) description in its analysis. The video tracking system attempts to track an object by determining whether an object is present in a query image. The query image may be broken down into one or more image patches, which may be different parts of the query image. The analytical device may analyze the one or more of the image patches in the query image to determine whether the object is present in the query image. The analysis may include determining whether one of the image patches in the query image is similar to the object being tracked. The BoF description of the image patch (and similarly the object) may represent a cloud of points in multidimensional feature space. The BoF description may be used in combination with the first aspect, described above.

In a third aspect, the object subject to tracking may be updated based on image patches matched from previous frames. The object may initially be defined in a variety of ways, such as using the characteristics of the image patch to which the object is first matched. In this way, the object is born or created. The tracking system then attempts to track the object in subsequent frames, using the tracking to update the definition of the object.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIG. 12 is a table illustrating the change in asset scores corresponding to the reference datasets.

DETAILED DESCRIPTION

Figure 1:
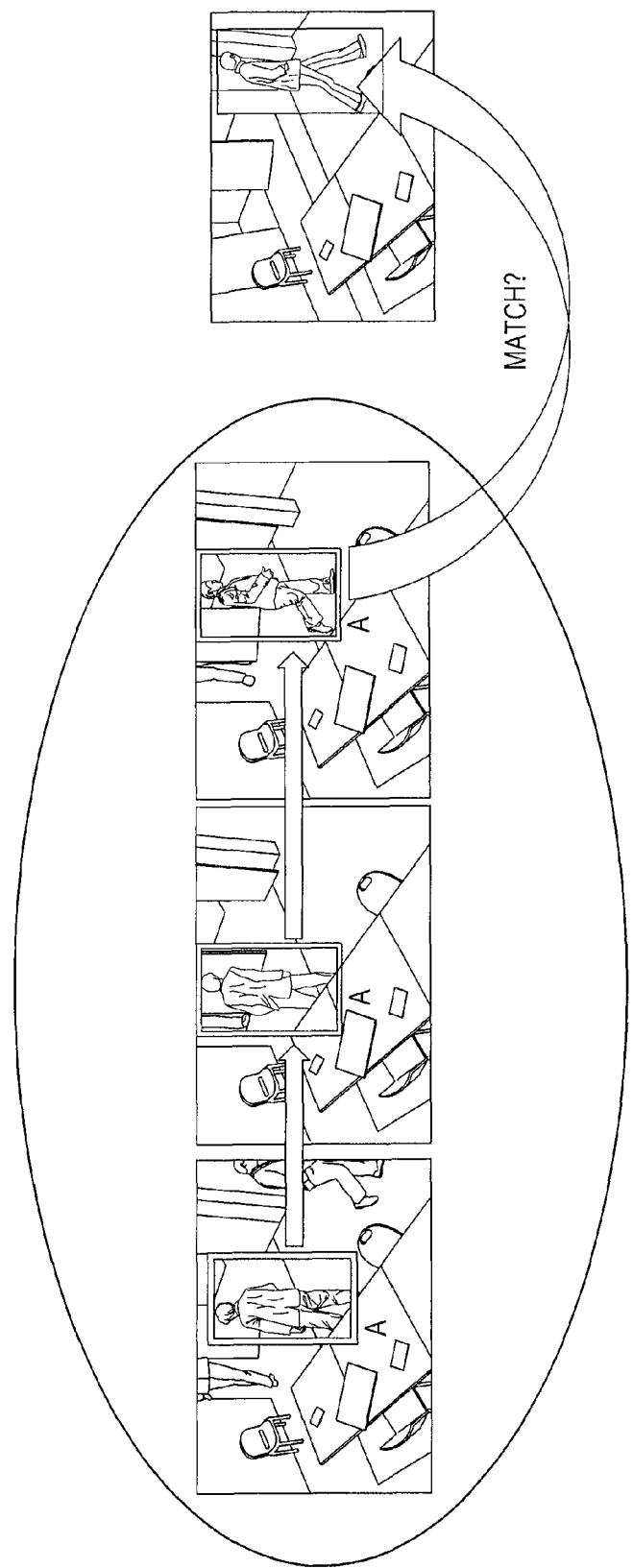
FIG. 1 illustrates an example of the matching problem in an object tracking scenario.

An analytical device is disclosed that analyzes whether a first image is similar to (or the same as) as a second image. In a first embodiment, the analytical device analyzes the first image by combining at least a part (or all) of the first image with at least a part (or all) of the second image, and by analyzing at least a part (or all) of the combined image. For instance, an abstraction of part or all of the first image may be combined with an abstraction of part or all of the second image. Part or all of the combination may be analyzed with respect to the abstraction of the first image and/or the abstraction of the second image. The abstraction may be based on a Bag of Features (BoF) description, based on a histogram of intensity values, or based on one or more other types of abstraction methodologies. The analysis may involve comparing one or more aspects of the combination (such as the entropy or randomness of the combination) with the one or more aspects of the abstracted first image and/or abstracted second image. For example, the analysis may comprise calculating a randomness parameter using the entropy measure based on information theory. Based on the comparison, the analytical device may determine whether the first image is similar to or the same as the second image. So that, if the entropy of the combined image increases minimally, the analytical device may conclude that the first image and the second image are similar.

The analytical device may work with a variety of images in a variety of applications. For example, the analytical device may comprise a video tracking system in which a part (or all) of the query frame may be compared with an object. The object may be defined based on matches to images in previous frames (such as an image patch in a previous frame or a combination of image patches in multiple previous frames). As another example, the analytical device may be used in biometrics. For example, in face biometrics, a query face image may be compared with one or more stored images, with the analytical device scoring and/or ranking the comparison of query face image with the one or more stored images. As still another example, the analytical device may be used to analyze images in large databases. In particular, the analytical device may analyze a query image in the database to determine whether the query image is similar with one or more stored images in the database (such as one or more separate images or one or more frames in a video). Similarity may be indicated based on a score and/or rank of the closeness of the query image with one, some, or all the stored images.

In a second embodiment, the analytical device may be a video tracking system that utilizes a Bag of Features (BoF) description in its analysis. The video tracking system attempts to track an object by determining whether an object is present in a query image. As discussed above, the object may be a person (or a part of a person), an object, or the like. The query image may be broken down into one or more image patches, which may be different parts of the query image. The analytical device may analyze the one or more of the image patches in the query image to determine whether the object is present in the query image. The analysis involves determining whether one of the image patches in the query image is similar to the object being tracked. The BoF description of the object and the image patches enable the capture of rich semantic information of the object and the image patch, and hence aid in better determining whether the object is similar to one of the image patches. In one aspect, the BoF description of the image patch (and similarly the object) represents a cloud of points in multidimensional feature space. The BoF description may be used in combination with the first embodiment, described above.

In a third embodiment, the object subject to tracking is updated based on image patches matched from previous frames. As discussed above, the object may be the person or thing being tracked in the video. The object may initially be defined in a variety of ways. One way is to assign the characteristics of the image patch to which the object is first matched. For example, after foreground/background segmentation, one or more image patches (or "blobs") may be found in the current video frame (e.g., frame 1). If there are no objects in the current list to track, or if one of the image patches does not match to any of the objects on the current list to track, the image patch without a matched object may be used to characterize the object (e.g., image_patch$_{frame\ 1}$). In this way, the object is born or created. The tracking system then attempts to track the object in subsequent frames.

In the subsequent frame, after foreground/background segmentation, one or more image patches are found in the current video frame (e.g., frame 2). Further, using image_patch$_{frame\ 1}$, the object is matched to one of the image patches in frame 2 (e.g., image_patch$_{frame\ 2}$). After a match of the object to one of the image patches in frame 2, the definition of the object is updated based on the match. For example, image_patch$_{frame\ 1}$ and image_patch$_{frame\ 2}$ may be used to define or characterize the object. In this way, the definition of the object may change dynamically from one frame to the next. In the instance where the image patch is defined as a cloud of points in a feature space, combining image_patch$_{frame\ 1}$ and image_patch$_{frame\ 2}$ may be accomplished by fusing the two clouds.

Figure 2:
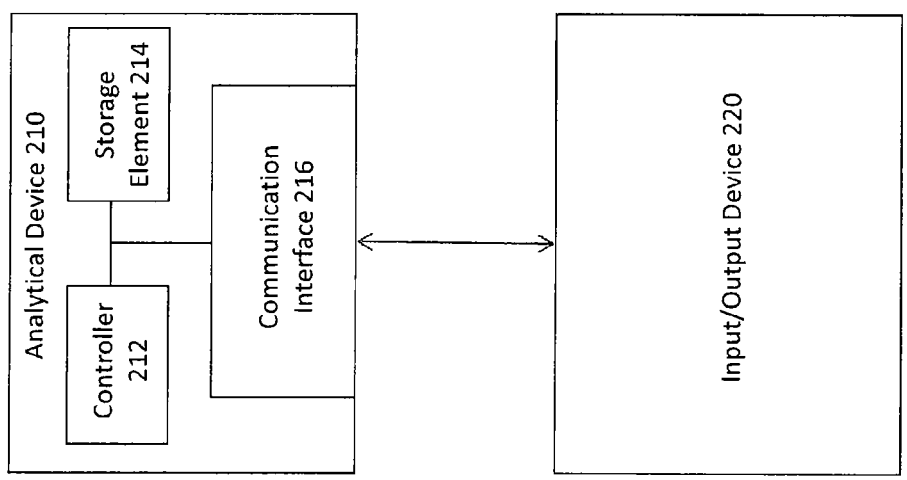
FIG. 2 is a block diagram of a system for analyzing one or more images.

Referring to FIG. 2, there is illustrated an analytical device 210, which may comprise an electronic device such as a computer. The analytical device 210 may include a controller 212, such as a processor, microcontroller, or other type of arithmetic logic unit. The analytical device may further include a storage element 214, which may comprise volatile and/or non-volatile memory, and may include one or more programs stored thereon. The storage element 214 may comprises an internal or externally accessible database, and may store one or more images.

Figure 3:
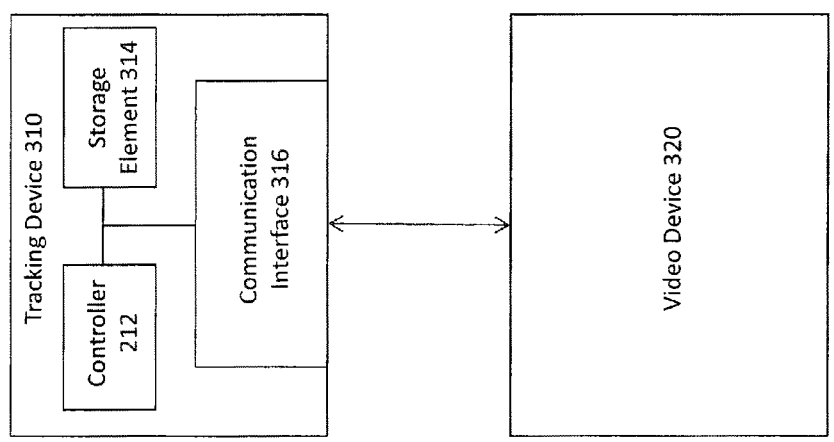
FIG. 3 is a block diagram of a video tracking system.
Figure 4:
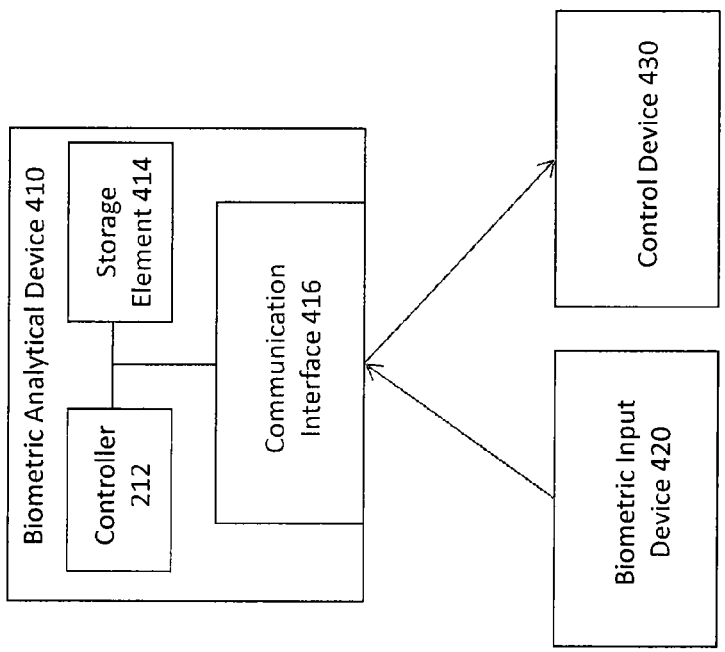
FIG. 4 is a block diagram of a biometric analytical system.
Figure 5:
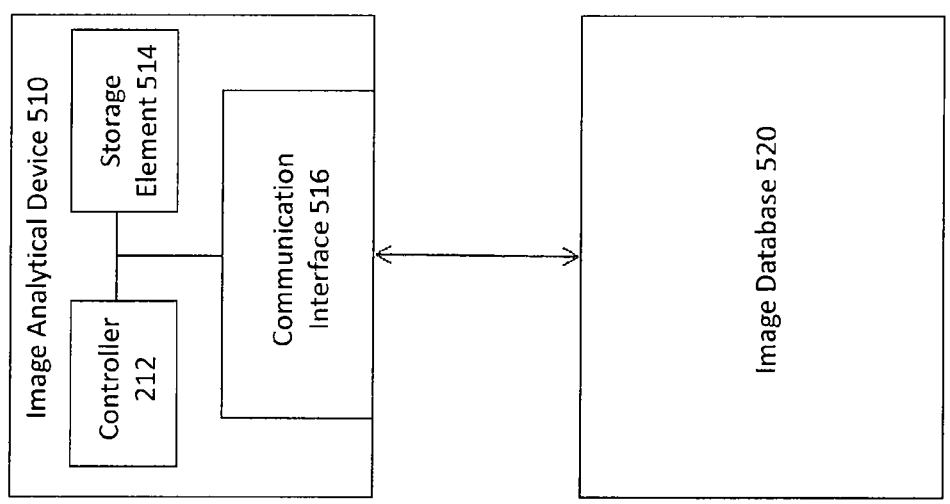
FIG. 5 is a block diagram of database image analytical system.

The analytical device 210 may communicate, via a communication interface 216, with an input/output device 220. The input/output device 220 may be an input device, an output device, a combination of an input device and an output device, or a separate input device and a separate output device. As discussed subsequently, the analytical device 210 may work in combination with a video device (such as a video recorder or other device that records images and/or audio), as shown in FIG. 3, a biometric input device/control device, as shown in FIG. 4, or an image/video database, as shown in FIG. 5.

The storage element 214 may be a main memory, a static memory, or a dynamic memory. The storage element 214 may include, but may not be limited to, computer-readable storage media such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like.

In one case, the storage element 214 may include a cache or random access memory for the controller 212. Alternatively or in addition, the storage element 214 may be separate from the controller 212, such as a cache memory of a processor, the system memory, or other memory. The storage element 214 may be an external storage device or database for storing data. Examples may include a hard drive, compact disc ("CD"), digital video disc ("DVD"), memory card, memory stick, floppy disc, universal serial bus ("USB") memory device, or any other device operative to store data. The storage element 214 may be operable to store instructions executable by the controller 212. The functions, acts or tasks illustrated in the figures (such as FIG. 11) or described herein may be performed by the programmed controller 212 executing the instructions stored in the storage element 214. The functions, acts or tasks may be independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The analytical device 210 may also include a communication interface 216 to enable communication with multiple devices via the network. The communication interface 216 may be created in software or may be a physical connection in hardware. The communication interface may be configured to connect with a network, external media, the display, or any other components in system, or combinations thereof The connection with the network may be a physical connection, such as a wired Ethernet connection or may be established wirelessly as discussed below. Likewise, the additional connections with other components of the system may be physical connections or may be established wirelessly.

The analytical device 210 may optionally include a display, such as a liquid crystal display (LCD), an organic light emitting diode (OLED), a flat panel display, a solid state display, a cathode ray tube (CRT), a projector, a printer or other now known or later-developed display device for outputting determined information. The display may act as an interface for the user to see the functioning of the controller 212, or specifically as an interface with the software stored in the storage element 214 or in the drive unit.

Additionally, the analytical device 210 may optionally include an input device configured to allow a user to interact with any of the components of system. The input device may be a number pad, a keyboard, or a cursor control device, such as a mouse, or a joystick, touch screen display, remote control or any other device operative to interact with the system.

The analytical device 210 may also optionally include a disk or optical drive unit. The disk drive unit may include a computer-readable medium in which one or more sets of instructions, e.g. software, can be embedded. Further, the instructions may perform one or more of the methods or logic as described herein. The instructions may reside completely, or at least partially, within the storage element 214 and/or within the controller 212 during execution by the computer system. The storage element 214 and the controller 212 also may include computer-readable media as discussed above. For example, the instructions to perform the actions illustrated in FIG. 11 (described below) may be included in the storage element 214.

The present disclosure contemplates a computer-readable medium that includes instructions or receives and executes instructions responsive to a propagated signal. The instructions may be implemented with hardware, software and/or firmware, or any combination thereof. Further, the instructions may be transmitted or received over the network via a communication interface 216.

Referring to FIG. 3, there is illustrated a tracking device 310, which may track one or more objects in a video or in a series of still images representing scenes of motion. The tracking device 310 includes a controller 212, which may be the same as controller 212 in the analytical device 210. The tracking device 310 further includes a storage element 314, which may include volatile or non-volatile memory. The storage element 314 may store archival or historical video recordings or archival or historical still images, and may store real-time video recordings and still images. The tracking device 310 may also include a communication interface 316 in order for the tracking device 310 to communicate with a video device 320. The video device 320 may be a video camera, or a still camera which is configured to obtain a series of still images.

Referring to FIG. 4, there is shown a biometric analytical device 410, which may analyze one or more biometric inputs. The biometric analytical device 410 may include methods by which to uniquely recognize humans based upon one or more intrinsic physical or behavioral traits. For example, biometrics may be used as a form of identity access management and access control. Biometrics may also be used to identify individuals in groups that are under surveillance.

Biometrics may relate to physiological unique traits. Examples of such traits include, but are not limited to fingerprint, face recognition, DNA, Palm print, hand geometry, iris recognition, retinal scan, and odor/scent. Biometrics may also relate to the behavior of a person. Examples include, but are not limited to typing rhythm (e.g., keystroke dynamics), gait, and voice.

The biometric analytical device 410 includes a controller 212, which may be the same as controller 212 in the analytical device 210. The biometric analytical device 410 further includes a storage element 414, which may include volatile or non-volatile memory. The storage element 414 may store the captured biometric (such as a copy of a particular person's or an identifiable fingerprint, face recognition, DNA, palm print, hand geometry, iris recognition, retinal scan, etc.). The storage element 414 may further store biometric inputs (such as an image) received from a biometric input device 420 in order to compare with the captured biometric. The biometric analytical device 410 may also include a communication interface 416 in order for the biometric analytical device 410 to communicate with the biometric input device 420 and a control device 430. The biometric input device 420 may include a fingerprint scanner, a retinal scanner, an iris scanner, or the like. The control device 430 may control access to one or more areas and resources in a given physical facility or control access to a computer-based information system. For example, the control device 430 may control access to an area (such as an electronic lock), or may control access to an electronic device (such as a computer, a database, etc.).

Referring to FIG. 5, there is shown an image analytical device 510, which may analyze one or more images. The image analytical device 510 may include methods by which to analyze multiple images stored on image database 520. The image analytical device 510 includes a controller 212, which may be the same as controller 212 in the analytical device 210. The image analytical device 510 further includes a storage element 414, which may include volatile or non-volatile memory, and may store still images and/or video. A sample image may be compared against one or more images stored in a database. The result of the comparison may be a determination of which of the images stored in the database are similar to the sample image. For example, the analysis may be used in order to reduce the number of duplicate images that are stored in a database. As another example, the analysis may be used to determine whether the sample image was present in an archival database. In particular, if a particular image (such as of a person) is designated as the sample image, the analysis may review the images in archival video footage to determine whether the person was present in any of the images of the database.

As discussed above, the analytical device 210 may compare two different abstractions, and determine whether the abstractions are similar to one another. As one example, the analytical device may compare an abstraction of a first image (or a part of the first image) with an abstraction of a second image (or a part of the second image). The abstractions may then be used to track an object, to analyze a biometric input, or to analyze an image in a database. As discussed in more detail below, there are several ways in which to abstract an image patch or an object, including without limitation, a BoF description and a histogram of intensity values. The abstraction of the first image (or a part of the first image) may be at least partly combined with the abstraction of the second image (or a part of the second image), and the combination may be analyzed to determine whether the first image (or the part of the first image) is similar to the second image (or the part of the second image).

Similarly, the abstraction of the object being tracked (or a part of the object being tracked) may be combined with the abstraction of a query image (or a part of the query image), and the combination may be analyzed to determine whether the object being tracked (or the part of the object being tracked) is similar to the query image (or the part of the query image). In particular, the analytical device may compare an object being tracked (such as a person's face or body) with an image patch in a query frame in order to determine whether the object is similar to the image patch in the query frame. The object may be represented by an abstract representation, as discussed in more detail below, so that the abstract representation of the object may be combined with the abstract representation of the image patch. The combination may be analyzed to determine whether the object (as defined by its abstract representation) is similar to the image patch (as defined by its abstract representation).

Figure 6:
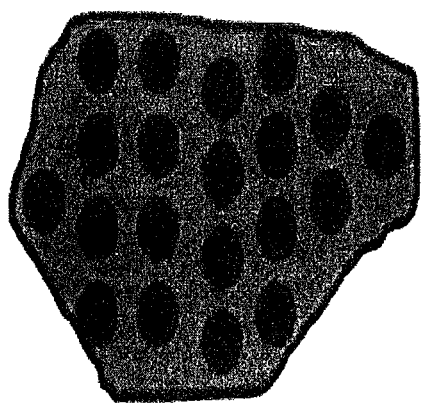
FIG. 6 is an illustration of an abstraction of an image patch with points within the image patch described in terms of fundamental features.

One type of abstraction is the BoF based description. BoF focuses on defining an object or an image (or a part of an image, such as an image patch) based on various features. FIG. 6 illustrates an example of an application of the BoF based description. FIG. 6 illustrates an image patch (show as the shaded blob), with points within the image patch represented as circles. The BoF description may focus on features at various parts of the image patch (such as at the points within the image patch as shown in FIG. 6). The BoF based description may be represented mathematically in a variety of ways, such as by using a BoF matrix, B, which characterizes the image patch. Referring to the example depicted in FIG. 6, the image patch may constitute "N" points, where each point can be described in terms of fundamental features, such as its X location, its Y location, its color value, its grayscale value, etc. In general, if each of the N points is described in terms of M features, this would lead to a BoF matrix B, where $$B = \begin{bmatrix} f_1^1 & f_1^2 & \cdots & f_1^M \\ f_2^1 & f_2^2 & \cdots & f_2^M \\ \vdots & \vdots & \cdots & \vdots \\ f_N^1 & f_N^2 & \cdots & f_N^M \end{bmatrix}. \quad (1)$$

In the example given as shown in Equation (1), the BoF matrix includes [x, y, YImage, cbImage, crImage, GradientInYImage, OrientationInYImage] as the 7 features that describe a point in the image patch. For example, "x" and "y" represent the "X" and "Y" location of the point within the image patch. The YImage, cbImage, and crImage, represent Y Cb Cr, which is one way of encoding RGB information. These features are merely for illustration purposes. Other features may be used in addition to, or instead of, the features listed.

Figure 7:
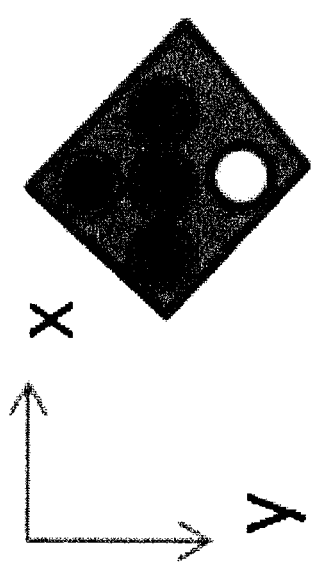
FIG. 7 is one example of the construction of a Bag of Features (BoF) matrix B of an image patch with only five points in it, wherein each row in matrix B corresponds to point in the patch, and with the first, second and the third column of matrix B corresponds to the x-location, y-location and the grayscale value of the point(s).

The ith row in this matrix corresponds to the ith point in the image patch. The jth column in the matrix corresponds to the jth feature. FIG. 7 illustrates a simpler example of the construction of a BoF matrix B of a patch with only five points in it. Each row in matrix B corresponds to point in the patch. The first, second and the third column of B corresponds to the x-location, y-location and the grayscale value of the point(s).

Figure 8:
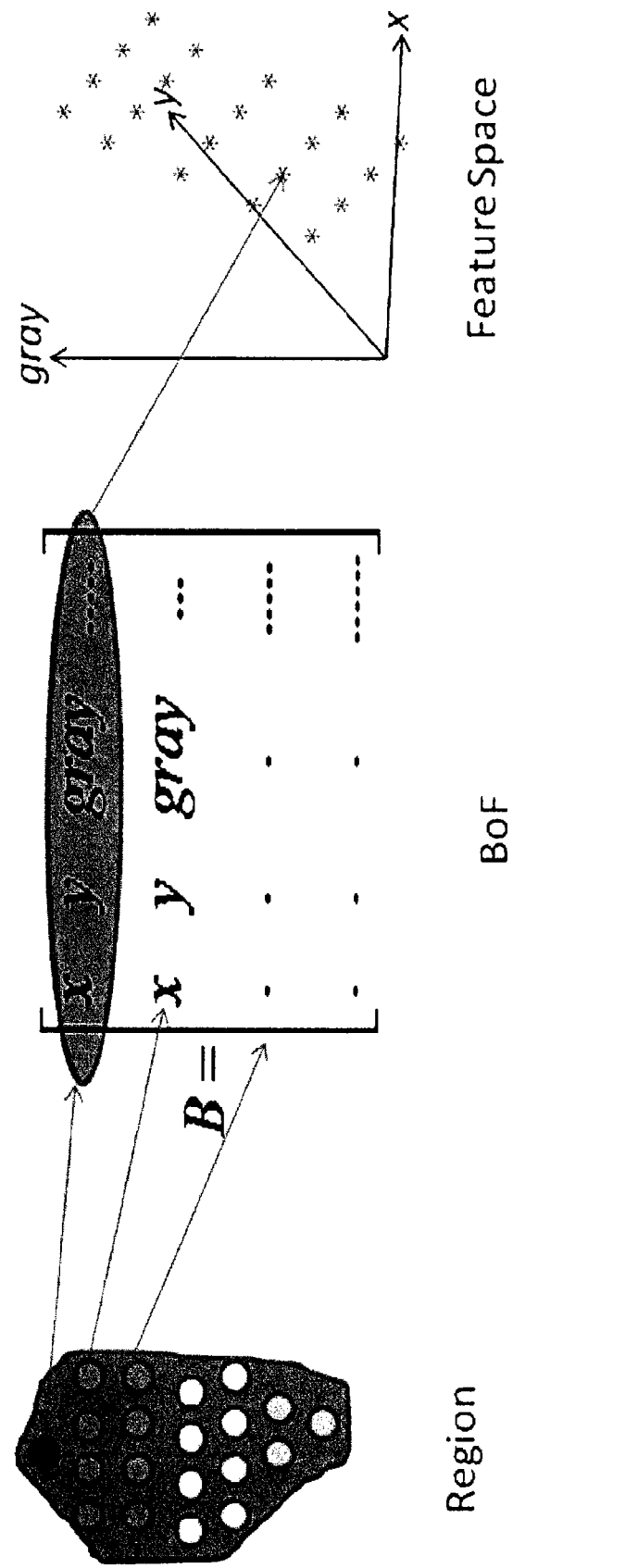
FIG. 8 is an illustration of the BoF matrix B for the image patch being represented as a cloud of points in high dimensional feature space.

The BoF matrix can be visualized in the high dimensional feature space as well. For the simple example illustrated in FIG. 7, in a 3-dimensional space spanned by the x-value, y-value, and grayscale value, there is a "cloud" of 5 points. In general, the mapping may be illustrated from an image patch/region to a cloud of points in the feature space, such as depicted in FIG. 8 in which the BoF matrix B for a patch is represented as a cloud of points in the high dimensional feature space. The statistics of the cloud in this high dimensional space may capture the characteristics of the image region. Moreover, the cloud may be described in a variety of ways. One way is by using a probability density function (PDF) of the cloud as the descriptor of the cloud.

Another type of abstraction is the histogram of intensity values. For example, an image patch B1 may be described simply using histograms of intensity values. One may assume: N data points with scalar values $f_1, \ldots f_N$, each $f_i$ are real numbers; and m intervals/bins defined by points $b_0$, $b_1, \ldots b_m$, where $b_i < b_{i+1}$ (assuming uniformly spaced bins, then $b_{i+1} - b_i = b$ for $i = 1, \ldots, m-1$). The histogram $h = (h_1, \ldots, h_m)$ records the number pints $f_j$ that fall into each bin. It may be calculated as follows: Set $h = (0, \ldots, 0)$, then, for $i = 1:N$, find the j such that $b_j \leq f_i < b_j + 1$ and set $h_j = h_j + 1$.

There are several variants of the histogram of intensity values that may be used to describe image patches, including without limitation: co-occurrence histograms; histogram of gradients; auto-correlograms.

After abstraction of the different image regions, the abstracted image regions may be compared. In one embodiment, the abstracted image regions are at least partly combined (such as combining some or all of the abstracted image regions), and at least a part (or all) of the combined abstracted image regions is analyzed. In a more specific embodiment, the combined abstracted image region is compared with one or both of the underlying abstracted image regions.

As discussed above, one way to abstract an image region is by computing a BoF matrix (and the corresponding PDF cloud) for the entire image region. To that end, in order to compare two image regions, the associated BoF matrix (and the PDF cloud) for each of the image regions are computed. To compare the two BoF matrices and hence their associated PDF cloud, the two PDFs are merged to form one single PDF. The single PDF is then analyzed. In one embodiment, the single PDF is analyzed for at least one aspect, such as randomness. For example, the single PDF (which was merged from the two PDFs) is compared with one (or both) of the two PDFs to determine randomness of the single PDF (such as determining whether the single PDF is more random than one (or both) of the two PDFs or determining how much more random the single PDF is compared to the two individual PDFs).

Alternatively, the image region may be divided into multiple sub-regions (such as 4 sub-regions), and the BoF representation may be generated for each of the multiple sub-regions. When comparing two image regions, the analytical device may compare each of the multiple sub-regions individually, or the entire image regions's BoF representation, and select the "best" score according to one or more specific rules. Examples of specific rules include without limitation a minimum rule (in which the image region and/or particular image sub-region is selected that has associated with it the minimum score), or a maximum rule (in which the image region and/or particular image sub-region is selected that has associated with it the maximum score).

Another way to abstract an image region is with an intensity histogram. In order to compare two patches $B_1$ and $B_2$, a normalized histogram $H_1$ is generated for $B_1$ and a normalized histogram $H_2$ is generated for $B_2$. The histograms ($H_1$ and $H_2$) may be combined, such as by creating an average histogram $H_{avg}=0.5(H_1+H_2)$. The combined histogram may be analyzed in order to determine the similarity or dissimilarity between patches B1 and B2 as follows $$\text{Delta}(B1, B2) = \text{Entropy}(H) - 0.5[\text{Entropy}(H1) + \text{Entropy}(H2)]$$

where $$\text{Entropy}(H) = -\sum_{i}^{n} h_i \log_e(h_i).$$

in which $[h_1, h_2, \ldots, h_n]$ are the bin values of the normalized histogram H.

B1 could be described simply using histograms of intensity values. The dissimilarity measure in Equation 2 (described below) may then be defined on the histograms in a similar manner. As an example, H1 may be the normalized histogram of B1 and H2 may be the normalized histogram of B2. An average histogram H=0.5(H1+H2) thus results.

Figure 9:
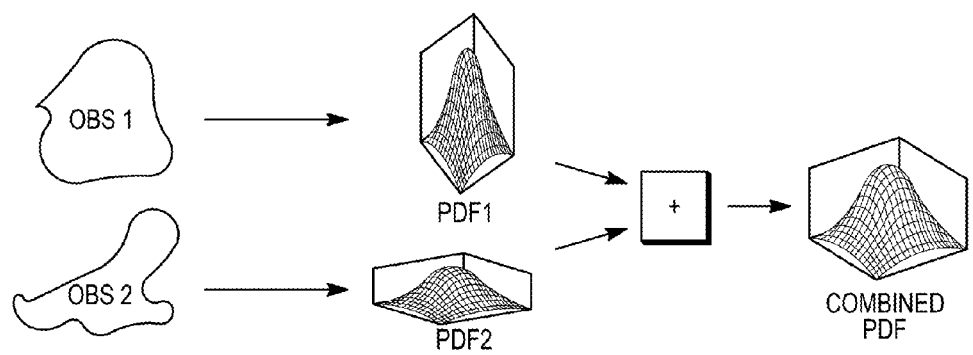
FIG. 9 is an illustration of two observation image patches, which are compared by first computing their BoF, followed by merging their probability density functions.

Referring to FIG. 9, there is shown one graphical example of generating the merged abstractions of the image regions. More specifically, FIG. 9 illustrates two observation image patches (Obs1 and Obs2 in FIG. 9) that are compared by first computing their BoF description, which is represented by their PDF clouds (pdf1 and pdf2 in FIG. 9). The abstractions of the observation image patches may be combined by merging of their PDF clouds (as shown in the combined pdf in FIG. 9). As discussed above, at least one aspect (such as randomness) of the merged cloud may be analyzed. One example of the analysis may include using entropy functions, in which H( ) corresponds to the entropy function computed for a given PDF. The dissimilarity metric that compares the two image clouds is:

$$\text{delta}(obs1, obs2) = H(\text{combined\_pdf}) - 0.5[H(\text{pdf1}) + H(\text{pdf2})]$$

Here obs1 has a probability distribution function of pdf1, and the mean and covariance corresponding to the distribution is ($\mu_{G1}$, $\Sigma_{G1}$). Similarly, obs2 has a probability distribution function of pdf2, and the mean and covariance corresponding to the distribution is ($\mu_{G2}$, $\Sigma_{G2}$). The combined distribution's PDF's mean and covariance matrices are ($\mu_G$, $\Sigma_G$).

Using the assumption that the pdfs' follow a Gaussian distribution, H(pdf1)=K+0.5 log (determinant ($\Sigma_{G1}$)), H(pdf2)=K+0.5 log(determinant($\Sigma_{G2}$)), and H(combined_pdf)=K+0.5 log(determinant($\Sigma_G$)), where K is a constant.

Thus, delta(obs1, obs2)=K+0.5 log(determinant($\Sigma_G$))−0.5 [2K+0.5 log (determinant ($\Sigma_{G1}$))+0.5 log (determinant ($\Sigma_{G2}$))]. Hence, $$\text{delta}(obs1, obs2) = \log \frac{|\Sigma_G|}{\sqrt{|\Sigma_{G1}||\Sigma_{G2}|}}. \qquad (2)$$

In the above formula, $\Sigma_G$ corresponds to the covariance matrix corresponding to the combined PDF, while $\Sigma_{G1}$ and $\Sigma_{G2}$ correspond to the covariance matrices associated with PDFs for obs1 and obs2, respectively.

Equation 2 provides an example of how two multivariate Gaussian distributions may be compared. A cloud of points in a feature space (such as a PDF cloud illustrated in FIG. 8) may be described by a multivariate Gaussian with mean µ1 and variance S1. If the first cloud is compared to a second cloud with mean µ2 and variance S2, one may first "fuse" the two clouds to create an intermediate description. If the intermediate description is random or chaotic, one may conclude that the two clouds of points that are being compared are quite dissimilar. On the other hand, if the intermediate description of the cloud is less chaotic, it would imply that the two initial clouds being compared are very similar.

The following illustrates how one may compute $\Sigma_G$ from $\Sigma_{G1}$ and $\Sigma_{G2}$, respectively. Since it may not be computationally practical to carry the BoF matrix and the corresponding cloud in the high dimensional space, especially for tracked objects, the BoF matrix and the corresponding PDF may be represented using the M×1 mean vector µ and the M×M covariance matrix Σ instead. The (i,j)th element of the matrix $\Sigma_G$ can be expressed in terms of the elements in $\mu_{G1}$, $\Sigma_{G1}$, $\mu_{G2}$, $\Sigma_{G2}$ as $$\Sigma_G(i,j)=0.5[\Sigma_{G1}(i,j)+\Sigma_G(i,j)+\mu_{G1}(i)\mu_{G1}(j)+ \mu_{G2}(i)\mu_{G2}(j)]-\mu_G(i)\mu_G(j),$$

where $$\mu_G(i)=0.5[\mu_{G1}(i)+\mu_{G2}(i)] \text{ and } \mu_G(j)=0.5[\mu_{G1}(j)+ \mu_{G2}(j)], \text{ respectively} \qquad (3)$$

Thus, Equation 3 illustrates how to combine the mean vector corresponding to the first cloud with the mean vector corresponding to the second cloud in order to compute the mean vector of the intermediate or the fused cloud. It is essentially the average of the two mean vectors.

Choosing to ignore the µ-component of the statistics, the formula to create the merged covariance matrix simplifies further to:

$$\Sigma_G(i,j)=0.5[\Sigma_{G1}(i,j)+\Sigma_{G2}(i,j)]. \qquad (4)$$

Thus, Equation 4 states that the covariance matrix of the intermediate or the fused cloud is an average of the individual covariance matrices. Of note, an object BoF is essentially a collection of the BoF of the individual image patches (one per frame) that have been matched to the object. Hence, the mean vector and the covariance vector of the object is computed and updated using Equation 3 or Equation 4, where G1 corresponds to the Gaussian describing the object, and G2 corresponds to the image patch that matched the object. After the match is established, G corresponds to the Gaussian describing the object.

Figure 10:
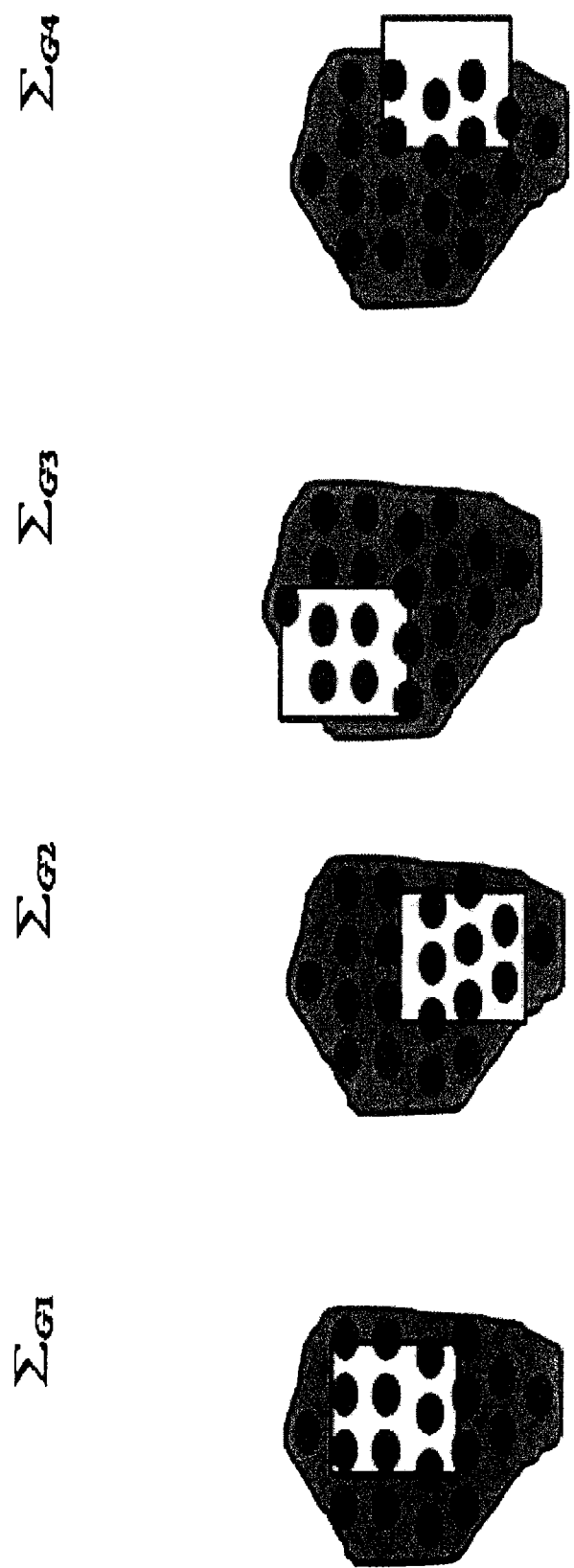
FIG. 10 is an illustration showing a sequence of the matching process, in which several subregions (shown in highlights) of an image patch are queried as possible matches to the object, with the BoF description for each subregion being computed separately, and the subregion that is closest to the object being chosen as the match.

One computation issue is the matching process of the image patch with the object. During the matching process, several subregions of the image patch may be queried. This is depicted in FIG. 10, in which the various boxes represent the subregions. In particular, during the matching process, several subregions (shown in boxes) of an image patch are queried as a possible match to the object. The BoF description for each patch may be computed separately, and the patch that is closest to the object is chosen.

Moreover, computing the mean vector and the variance matrix for a patch with N points involves several multiplications and additions. For example, the computation of $\Sigma_{G1}(i,j)$ for obs_1 involves O(N) multiplications and O(N) additions. During the matching process in tracking, the computation of this element in the covariance matrix is repeated for several query patches in the image. Of note is that there may be several redundant elements that are computed during the search process. To streamline the process, the covariance matrix elements are computed using the integral image approach. For M underlying features, $M(M-1)/2$ cross images are computed. For example, the x-y cross image corresponds to the multiplication of the x-Image and the y-Image of the points in the patch, where x-Image corresponds to the image where the (k, l)th location in the image corresponds to the x-value of this point in the image, and so on. The integral image of each of the cross images is also computed. The (k, l)th location of the integral image stores the sum of all the entries corresponding to the sub image with (0,0) and (k, l) being the top-left and the bottom-right points of the image. Although the computation of the $M(M-1)/2$ cross image and the integral image may appear to be a computationally expensive task, the SSE instruction sets may speed up the computation. Since integral image computation is a recursive operation, where the value of the (k, l)th location depends on the neighboring values of the image, it may not be able to compute them in parallel using a naïve implementation. In order to perform the computation, interleaving of the $M(M-1)/2$ integral images is performed, and observing that the (k, l)th location value of two integral images can be computed independent of each other. This assists in parallelizing the summation operations of the integral image computation through an SSE implementation.

The comparison of the two abstractions may generate various results, such as a score or a rank. For example, the abstractions for an object and an image patch may be compared, and a score or rank may be generated based on the comparison. As discussed in more detail in FIG. 11, a score or a rank above or at a predetermined amount may result in a determination of a "match" between the object and the image patch. Alternatively, when there are multiple image patches, the particular image patch/object combination that results in the highest score for similarity (or the lowest score if dissimilarity is the indicator) is declared the "match".

Figure 11:
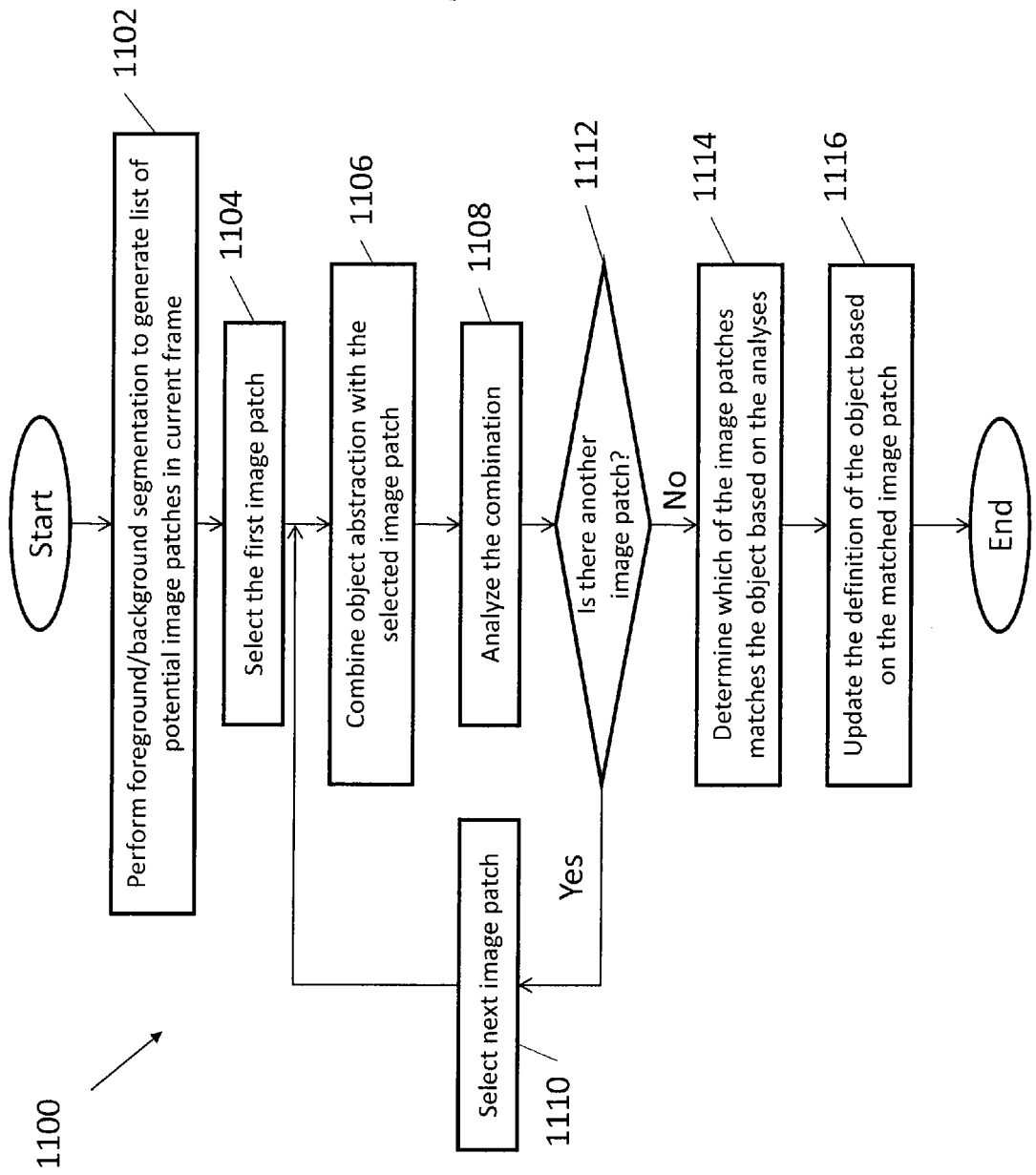
FIG. 11 is an example of a flow diagram for matching an image patch to an object.

Further, as discussed in FIG. 11, after an image patch is matched to an object, the definition of the object may be updated based on the matched image patch. One manner of updating the definition of the object is by fusing the abstraction of the image patch which is matched to the object with the abstraction of the object. Another manner of updating the definition of the object is by using the abstraction of the image patch as one mode in a multimodal abstraction. In particular, even when the object and the image patch are declared as a match, the dissimilarity value may be above a certain threshold (such as 0.2 for example). In those instances, instead of fusing the abstraction of the image patch to the abstraction of the object to maintain one single statistical description, a "multimodal" distribution may be used, such as a multimodal Gaussian distribution for the underlying BoF model of the object. In this way, an abstraction of an object may have several underlying Gaussian distributions, with each such distribution having an underlying mean and covariance matrix associated with it. When comparing an object with an image patch, the image patch Gaussian (which represents the image patch abstraction) may be compared to each of the object patch Gaussian using Equation 2 and the minimum value may be selected as the match dissimilarity. If it is later determined that the object has indeed matched the image patch, the object's BoF description is updated by either merging the image patch's Gaussian with the matching Gaussian corresponding to the object, or appending it to the object's BoF Gaussian set.

Therefore, at least a part of the combined image may be analyzed and compared with at least a part of each (or both) of the underlying images. For example, the entropy may be computed for the combined image, and compared with each (or both) of the underlying images, such as by subtracting the entropy for both of the underlying images (e.g., subtracting the average of the entropy for both of the underlying images). The result of subtracting the average entropy for both of the underlying images from the entropy of the combined image may then be analyzed. For example, the result of subtracting the average entropy for both of the underlying images from the entropy of the combined image may be compared to a threshold (such as the 0.2 threshold discussed above). If the result is equal to or less than the threshold, it may be determined that the underlying images (such as the object and the image patch) are a match. Alternatively, if the result is greater than the threshold, it may be determined that the underlying images (such as the object and the image patch) are not a match.

Referring to FIG. 11, there is shown a flow diagram 1100 for matching an image patch to an object. At 1102, foreground/background segmentation is performed in order to generate list of potential image patches in current frame. The foreground/background segmentation may generate multiple image patches for the current frame. The image patches may be of any size and shape, and are not limited to the rectangular shapes as shown in FIG. 1.

At 1104, the first image patch is selected. An abstraction of the first image patch may be generated, and at 1106, combined with the abstraction of the object. As discussed above, various types of abstractions for the image patch may be used, including BoF description and a histogram of intensity values. Further, the abstraction of the object may be a BoF description and a histogram of intensity values, and may be a single mode or multimodal, as discussed above. For example, the two images (sample image patch and the object) may be abstracted into statistical representations of individual clouds ($C_1$ and $C_2$). The statistical representations ($C_1$ and $C_2$) may then be combined to form a combined cloud (C).

At 1108, the combination may be analyzed. The analysis of the combination may be a comparison of the combination with one, some, or all of the abstractions used to generate the combination. For example, the combination (based on the abstraction of the image patch with the abstraction of the object) may be analyzed against the abstraction of the image patch and analyzed against the abstraction of the object. The analysis may be used to determine at least one feature of the combination as compared to the underlying image patch and object, such as the extent by which the randomness of the combination increases when compared to the image patch and when compared to the object. As discussed above, randomness is an indicator of whether the combination is more or less similar to the underlying image patch. The analysis of the combination may generate a score, which may be used thereafter to rank the various combinations.

In one embodiment, the analysis in 1108 may use a single metric (such as the BoF metric or the histogram metric). For example, the BoF metric may be used to generate BoF clouds of the image patch and the object. The BoF clouds of the image patch and the object may be combined to generate a BoF combined cloud. Further, the BoF combined cloud may be compared with the BoF cloud of the image patch and the BoF cloud of the object to determine the entropy or randomness of the combined cloud minus the average entropy or randomness of the individual clouds. Similarly, the histogram metric may be used to abstract the image patch and the object, with the abstractions being combined to generate a combined abstraction.

Assuming that the clouds follow Gaussian statistics, the entropy of cloud $C_1$ is the following:

$$C_1 = K + 0.5 \log(\text{determinant}(\Sigma_{G1}))$$

where K is a constant and is the covariance matrix of the Gaussian representing the statistics of the cloud. In this way, the entropy or randomness may simplify to Equation 2, discussed above.

Alternatively, the analysis in 1108 may use a combination of metrics (such as the BoF metric and the histogram metric). As merely one example, one or more threshold values may be used for the BoF metric, and one or more threshold values may be used for the histogram metric. In particular, $t_1$ and $t_2$ may be used for the BoF metric, with $t_1$ being less than $t_2$. Moreover, $t_3$ may be used for the histogram metric. Example values of $t_1$, $t_2$, and $t_3$ are 0.7, 1.5, and 0.5, respectively. The example values are merely for illustration purposes.

In practice, the comparison of the combination with the image patch used to generate the combination results in an indication of the closeness of the combination image with the underlying image patch. For example, using the BoF metric to analyze the combination results in d_b, an indicator of closeness of the combination with the underlying image patch. Likewise, using the histogram metric to analyze the combination results in d_h, an indicator of closeness of the combination with the underlying image patch.

One example of application of the thresholds is as follows:

If the d_b<$t_1$, then the indication of closeness is set equal to d_b.

If the d_b>$t_1$ and d_h<$t_3$, then the indication of closeness is set equal to d_h.

If d_h>$t_3$, then the indication of closeness is set equal to infinity (meaning that the combination and one of the image patches do not correlate or match at all.

At 1112, it is determined whether there is another image patch to analyze. If so, the next image patch is selected at 1110, and the loop repeats. If not, the analytical device determines which of the image patches matches the object based on the analyses at 1114. The analytical device may make this determination by examining one, some, or all of the combinations. For example, the analytical device may score each of the combinations based on the analysis at 1108, and may thus rank the combinations based on the assigned scores. The rank may indicate which of the combinations is most similar to the underlying abstraction of the corresponding image patch and/or object, and in turn indicate which of the image patches is most similar to the object. Thus, the ranking may indicate which of the image patches matches the object.

At 1116, the description of the object may be updated based on the matched image patch. One example of updating is to replace the definition of object $O_1$ by the definition of the image patch to which the object was matched in the current frame. Another example of updating is to fuse the definition of object $O_1$ with the definition of the image patch to which the object was matched in the current frame. An example of fusing is illustrated in FIG. 9. Still another example of updated is to add the definition of the matched image patch to the definition of the object O. As discussed above, the abstraction of the object $O_1$ may be multimodal. Adding the definition of the matched image patch to the definition of the $O_1$ may comprise adding a mode as defined by the matched image patch.

Referring to FIG. 12, there is shown a table illustrating the change in asset scores corresponding to the reference datasets. Using BoF based dissimilarity computation to drive the matching process, one may observe an improvement in the asset and tracking scores on some of the reference datasets. The BoF description may capture the semantics of an object in an image in detail, and this is reflected in the improved scores. In a similar manner, tracking score results, both for indoor and outdoor scenes, may improve. From the computational load viewpoint, overall execution time may increase; however, the increase in computational time using the BoF may be less than 5% of the time while using the histogram based matching approach. In order to further reduce BoF computation load, the BoF features need only be performed on the foreground patch (or blob) areas.

While the invention has been described with reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method of analyzing a known image abstraction and a query image abstraction to determine whether a query image is similar to a known image, the method comprising:

accessing the known image abstraction, the known image abstraction being based on part or all of the known image;

accessing the query image abstraction, the query image abstraction being based on part or all of the query image, the known image and the query image being of a same type;

combining at least a part of the known image abstraction with at least a part of the query image abstraction to generate a combined image abstraction;

comparing the combined image abstraction with at least a part of one or both of the known image abstraction and the query image abstraction; and determining whether the query image is similar to the known image based on comparing the combined image abstraction with at least a part of one or both of the known image abstraction and the query image abstraction, wherein the known image abstraction comprises a known covariance matrix:

wherein the query image abstraction comprises a query covariance matrix; and wherein combining at least a part of the known image abstraction with at least a part of the query image abstraction comprises combining the known covariance matrix with the query covariance matrix.

2. The method of claim 1, wherein the known image abstraction comprises a known Bag of Features (BoF) description, the known BoF description representing a cloud of points in multidimensional feature space; and the query image abstraction comprises a query BoF description.

3. The method of claim 1, wherein comparing the combined image abstraction with at least a part of one or both of the known image abstraction and the query image abstraction includes comparing entropy of the combined image abstraction with entropy of one or both of the known image abstraction and the query image abstraction.

4. The method of claim 1, wherein the known image abstraction comprises an object abstraction associated with an object being tracked by a video tracking system; and wherein the query image abstraction is associated with an image patch in a video frame.

5. The method of claim 4, further comprising:

performing foreground/background segmentation to generate a list of multiple image patches in the video frame;

generating an abstraction for each of the multiple image patches;

iteratively combining the object abstraction with each of the abstractions for the multiple image patches to generate combined abstractions; and analyzing the combined abstractions to determine which of the multiple image patches is most similar to the object abstraction.

6. The method of claim 5, wherein the object abstraction is updated based on the image patch most similar to the object abstraction.

7. The method of claim 6, wherein the object abstraction is fused with the image patch most similar to the object abstraction.

8. The method of claim 6, wherein the object abstraction comprises a multimodal abstraction; and wherein one mode of the multimodal abstraction is modified using the image patch most similar to the object abstraction.

9. The method of claim 4, wherein the object abstraction comprises an object cloud of points;

wherein each of the multiple image patches comprise a respective cloud of points; and wherein generating the combined image abstractions comprises fusing the object cloud of points with each of the respective clouds of points.

10. The method of claim 1, wherein comparing the combined image abstraction with at least a part of one or both of the known image abstraction and the query image abstraction comprises generating a score indicative of randomness of the combined image abstraction with at least a part of one or both of the known image abstraction and the query image abstraction; and wherein determining whether the query image is similar to the known image comprises comparing the score with a predetermined amount.

11. The method of claim 3, wherein comparing the combined image abstraction with at least a part of one or both of the known image abstraction and the query image abstraction further comprises:

determining entropy of the combined image abstraction;
determining entropy of the known image abstraction and entropy of the query image abstraction;
combining the entropy of the known image abstraction and the entropy of the query image abstraction to generate an entropy of underlying images; and
generating a dissimilarity metric by subtracting the entropy of the underlying images from the entropy of the combined image abstraction, wherein determining whether the query image is similar to the known image comprises using the dissimilarity metric to determine whether the query image is similar to the known image.

12. The method of claim 1, wherein the query image abstraction comprises a first query image abstraction based on a first part of the query image;

wherein a second query image abstraction is based on a second part of the query image, the first part of the query image being different from the second part of the query image;

wherein combining at least a part of the known image abstraction with at least a part of the query image abstraction to generate a combined image abstraction comprises:

generating a first combined image abstraction by combining at least a part of the known image abstraction with at least a part of the first query image abstraction;

generating a second combined image abstraction by combining at least a part of the known image abstraction with at least a part of the second query image abstraction;

wherein comparing the combined image abstraction with at least a part of one or both of the known image abstraction and the query image abstraction comprises:

generating a first score indicative of randomness of the first combined image abstraction with at least a part of one or both of the known image abstraction and the first query image abstraction;

generating a second score indicative of randomness of the second combined image abstraction with at least a part of one or both of the known image abstraction and the second query image abstraction;

wherein determining whether the query image is similar to the known image comprises:

comparing the first score with the second score; and
determining whether the first part of the query image or the second part of the query image is similar to the known image based on comparing the first score with the second score.

13. A method for tracking an object in multiple image frames, the method comprising:

accessing a current image frame;
performing foreground/background segmentation to generate at least one image patch in the current image frame;
abstracting the at least one image patch into a query covariance matrix, the query covariance matrix representing a cloud of points in multidimensional feature space;
accessing a known covariance matrix indicative of the object, the known covariance matrix being based, at least in part on one or more image frames previous to the current image frame;
combining at least a part of the query covariance matrix with the known covariance matrix; and
analyzing the combined covariance matrix in order to determine whether the at least one image patch is similar to the object.

14. The method of claim 13, wherein the multiple image frames comprises successive frames in a video; and wherein the query covariance matrix is computed with an interleaved integral image approach, with interleaving of the M(M−1)/2 integral images being performed, and computing (k. 1)th location value of two integral images independently of each other, where M is a number of features.

15. The method of claim 13, wherein performing foreground/background segmentation generates image patches in the current image frame;

wherein analyzing the combined covariance matrix determines which of the image patches is most similar to the object; and wherein the known covariance matrix is updated based on the image patch most similar to the object.

16. The method of claim 15, wherein the known covariance matrix is fused with the image patch most similar to the object abstraction.

17. The method of claim 15, wherein the known covariance matrix is based on a multimodal distribution; and wherein one mode of the multimodal distribution is modified using the image patch most similar to the known covariance matrix.

18. An apparatus for analyzing a known image abstraction and a query image abstraction to determine whether a query image is similar to a known image, the apparatus comprising:

at least one memory configured to store the known image abstraction and the query image abstraction, the known image abstraction being based on part or all of the known image, the query image abstraction being based on part or all of the query image, the known image and the query image being of a same type; and a controller in communication with the memory and configured to:

combine at least a part of the known image abstraction with at least a part of the query image abstraction to generate a combined image abstraction;

compare the combined image abstraction with at least a part of one or both of the known image abstraction and the query image abstraction; and determine whether the query image is similar to the known image based on comparing the combined image abstraction with at least a part of one or both of the known image abstraction and the query image abstraction, wherein the known image abstraction comprises a known covariance matrix;

wherein the query image abstraction comprises a query covariance matrix; and wherein the controller is configured to combine at least a part of the known image abstraction with at least a part of the query image abstraction by combining the known covariance matrix with the query covariance matrix.

19. The apparatus of claim 18, wherein the known image abstraction comprises a known Bag of Features (BoF) description, the known BoF description representing a cloud of points in multidimensional feature space; and the query image abstraction comprises a query BoF description.

20. The apparatus of claim 18, wherein the controller is configured to compare the combined image abstraction with at least a part of one or both of the known image abstraction and the query image abstraction by comparing entropy of the combined image with entropy of one or both of the known image abstraction and the query image abstraction.

21. The apparatus of claim 18, wherein the known image abstraction comprises an object abstraction associated with an object being tracked by a video tracking system;

wherein the query image abstraction is associated with an image patch in a video frame; and wherein the controller is further configured to perform foreground/background segmentation to generate a list of multiple image patches in the video frame;

generate an abstraction for each of the multiple image patches;

iteratively combine the object abstraction with each of the abstractions for the multiple image patches to generate combined abstractions; and analyze the combined abstractions to determine which of the multiple image patches is most similar to the object abstraction.

22. The apparatus of claim 21, wherein the object abstraction is updated based on the image patch most similar to the object abstraction.

23. An apparatus for tracking an object in multiple image frames, the apparatus comprising:

at least one memory configured to store a current image frame and an object abstraction of the object, the object abstraction comprising an object covariance matrix based, at least in part on one or more image frames previous to the current image frame, the object covariance matrix representing a cloud of points in multidimensional feature space; and a controller in communication with the memory and configured to:

access the current image frame;

perform foreground/background segmentation to generate at least one image patch in the current image frame;

abstract the at least one image patch into a query covariance matrix to generate abstracted at least one image patch;

combine at least a part of the query covariance matrix with the known covariance matrix; and analyze the combined covariance matrix in order to determine whether the at least one image patch is similar to the object.

24. The apparatus of claim 23, wherein the covariance matrix is defined based on a Bag of Features (BoF) description;

wherein rows in a BoF matrix correspond to points in the respective image patch; and wherein columns of the BoF matrix comprise the x-location, y-location and the grayscale value of the points.

* * * * *

UNITED STATES PATENT AND TRADEMARK OFFICE
CERTIFICATE OF CORRECTION

PATENT NO. : 8,600,172 B2  Page 1 of 1
APPLICATION NO. : 13/049527
DATED : December 3, 2013
INVENTOR(S) : Kuntal Sengupta et al.

It is certified that error appears in the above-identified patent and that said Letters Patent is hereby corrected as shown below:

In the Claims

In column 16, claim 14, line 46, after computing replace (k.1) with --(k,1)--.

Signed and Sealed this
Eleventh Day of February, 2014

Michelle K. Lee
*Deputy Director of the United States Patent and Trademark Office*